Oct. 27, 1925.  
W. J. SCHIRMANN  
AUTOMOBILE SIGNAL  
Filed Jan. 17, 1925
1,559,007
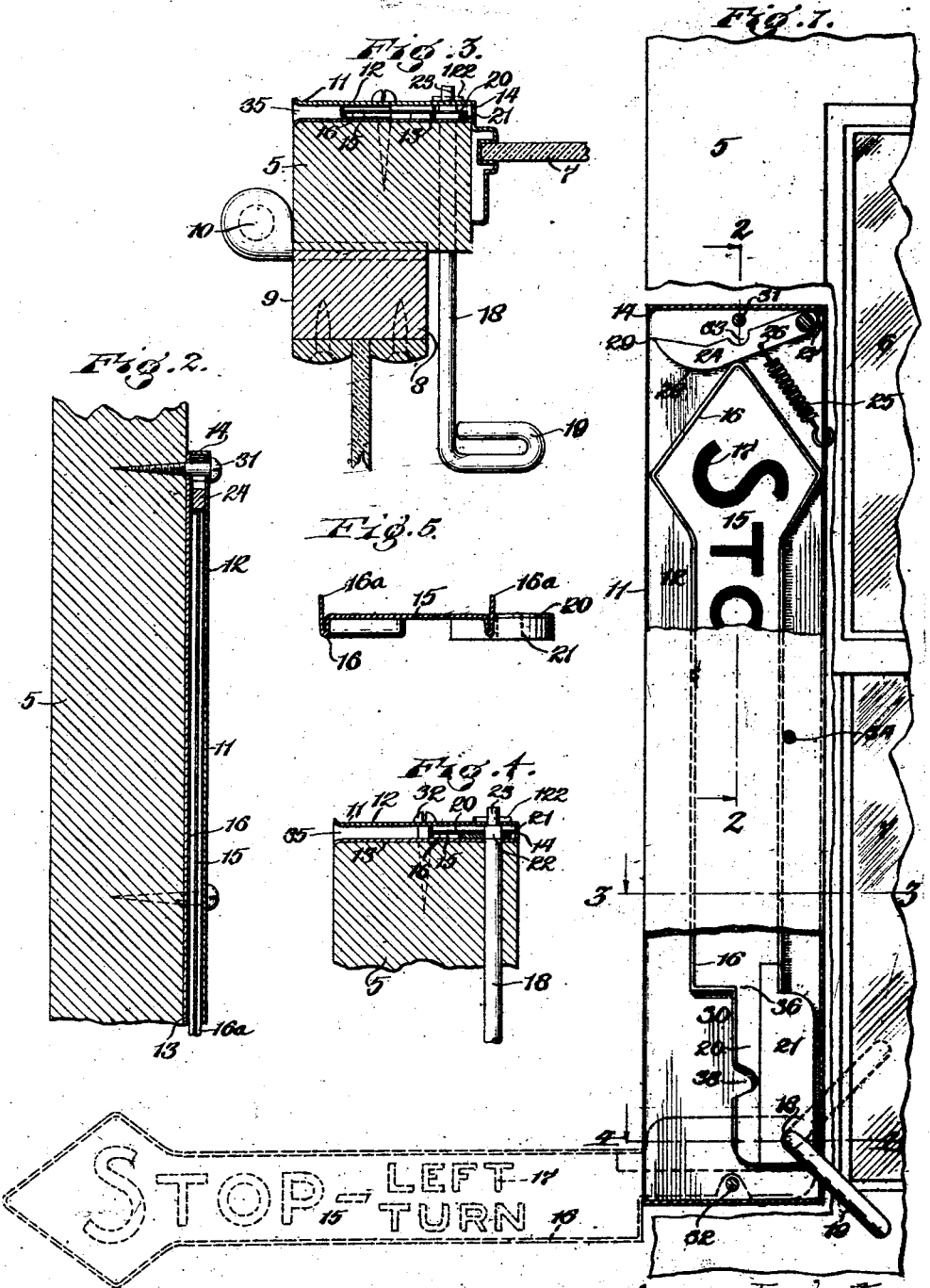

Patented Oct. 27, 1925.

1,559,007

UNITED STATES PATENT OFFICE.

WILLIAM J. SCHIRMANN, OF BUFFALO, NEW YORK.

AUTOMOBILE SIGNAL.

Application filed January 17, 1925. Serial No. 3,024.

*To all whom it may concern:*

Be it known that I, WILLIAM J. SCHIRMANN, a citizen of the United States, residing at Buffalo, in the county of Erie and State of New York, have invented new and useful Improvements in Automobile Signals, of which the following is a specification.

This invention relates to a traffic signal and more particularly to a signal adapted to be mounted on an automobile whereby an indication may be given to the traffic in rear and in front of the automobile of the driver's intention to make a left turn.

One of the objects of this invention is to provide a compact, simple, durable and inexpensive signal which is operated by means within convenient reach of the operator of the automobile.

Another object is to render the signal inconspicuous when not in use but is adapted to give a prominent signal indication when operated.

A further object is to provide a signal which requires no special skill to mount on the car and which is so designed that the same does not interfere with the adjacent parts of the automobile.

In the accompanying drawings:

Figure 1, is a rear view of the supporting post and windshield of an automobile showing the post broken away and disclosing the traffic signal, the signal being shown partly in section.

Figure 2, is a sectional elevation taken on line 2—2, Fig. 1.

Figure 3, is a horizontal section taken on line 3—3, Fig. 1.

Figure 4, is a similar section taken on the line 4—4, Fig. 1.

Figure 5, is a transverse section of the signal arm.

Similar characters of reference indicate like parts in each of the several figures.

The signal is primarily designed for use on cars of the closed type and is adapted to project a signal arm or indicator out from the left side of the car adjacent the driver. For this purpose the signal mechanism is mounted on the upright post or support 5 which extends upwardly from the body of the car and supports the canopy or roof thereof (not shown) and also supports the several sections 6 and 7 of the windshield and has hinged thereon the usual frame 8 of the side door of the car, the outer face 9 of which is substantially flush with the post, the pivotal part 10 of the hinge thereof being arranged on the outer side of the post so as to permit the door to be swung outwardly from the body.

In its general organization the signal comprises a casing which is arranged vertically on the front side of the post and contains a signal arm which is adapted to be projected laterally therefrom into a signaling position by means which extend through the post and are operable from the inside of the car.

The casing 11 of the signal is preferably stamped of sheet metal and painted or varnished to conform to the finish of the car and comprises a front side or wall 12, a rear side 13, and separating flanges 14 which are arranged on three sides of the casing and form side walls therefor, the remaining side of the casing being left open to form the opening 35 through which the signal arm is moved into and out of the casing.

The indicator or signal arm 15 is adapted to be arranged vertically within the casing longitudinally thereof and preferably is made of sheet metal and provided with laterally projecting marginal flanges 16 and 16ᵃ whereby the arm is stiffened. As best shown in Figure 5, these marginal flanges extend forwardly and rearwardly from the face of the signal arm, the rearwardly extending flange 16 being reversely bent, the outer or reversely bent part of which is continued beyond the edge of the signal arm and forms the forwardly projecting marginal flange 16ᵃ extending from the front face of the signal arm. By employing a marginal flange of this character, the signal arm is strengthened or re-inforced so as to permit it to be made of small gage sheet metal, and it also permits of making the flange very narrow permitting a very thin and inconspicuous casing to be used, and it also protects the indicating surface from wear. This signal arm is made in the form of an arrow, for a purpose which will presently appear, and is painted a color which readily attracts the attention, and suitable indicia 17 are painted on both sides of the arm which indicate the driver's intention to make the left turn such as, "Stop—left turn" on the rear face to warn drivers attempting to pass the car and "left turn" on the front side to announce the driver's intention to traffic and pedestrians ahead of the car.

The means for swinging the signal arm into an indicating position are arranged at the lower end thereof and comprise an operating rod or shaft 18 secured to the signal arm which operating shaft extends rearwardly through the supporting post and is formed or bent at its rear end so as to provide a transverse operating handle 19. In order to permit the operating shaft 18 to extend through the post 5 at a point where it will not interfere with the adjacent frame 8 of the side door or require the same to be cut away to accommodate the shaft, the shaft, which forms the pivotal point of the indicating arm is arranged to one side of the longitudinal center line of said arm, and for this purpose the arm is provided at its lower end with a laterally offset portion 20 which extends inwardly or away from the opening 35 and permits the arm to be mounted on the operating shaft at a point adjacent the side wall 14. Moreover by offsetting the lower end of the signal arm a recess 30 is provided therein which permits the signal arm to be lowered into a position below the lower end of the casing, as shown by the dotted lines in Fig. 1. To securely mount the signal arm on the operating shaft so as to turn therewith, a block 21 is provided on the inner side of the offset portion 20 which block extends beyond the narrow portion 36 of the arm and thereby strengthens the same and also projects beyond the edge of the marginal flange 15 thereby preventing contact between this flange and the adjacent inner wall 13 of the casing. The operating shaft is squared at this point as shown at 22 in Fig. 4 and is received in a correspondingly shaped opening in the block 21. The connection is maintained between these parts by a cotter pin 122 which extends through the reduced front end 23 of the rod which end projects through the front side of the casing.

In order to retain the signal arm in the casing, a detent finger 24 is pivoted within the upper end of the casing so as to project toward the opening 35 thereof. A downward pressure is exerted on this detent by a coil spring 25 which engages the same through an opening 26 provided therein and at its lower end is secured in any suitable manner to the adjacent wall 14 of the casing. To limit the downward movement of the detent finger when the signal arm is swung out of the casing the detent finger is provided with an abutment on the inner side of its pivotal point which is provided on its upper side with an abutting face 27 which is adapted to engage the upper wall 14 of the casing and prevent the detent finger from swinging downwardly beyond a predetermined limit; thereby preventing the same from interfering with the entrance of the signal arm. This detent is adapted to engage the outer end or point of the signal arm when the same is swung into the casing and for this purpose the detent is provided with a curved or cam face 28 on its under side which terminates in a pointed end 29. It is obvious that as the signal is swung into the casing, the detent is raised until the high point of its cam face is reached after which the detent will force the arm inwardly against the inner wall of the casing and hold the same therein preventing it from rattling. It will be observed that by making the signal arm in the form of an arrow the head thereof forms a cam, the curved face of the detent operating to force the arm inwardly when it engages the outer inclined side or flange thereof, and operating to force the same out of the casing when the inner edge or flange of the arrow head is engaged.

Any suitable means may be provided for securing the signal to the supporting post but the same preferably comprises upper and lower screws 31 and 32 which extend through the casing and engage the post, the adjacent portions of the detent and signal arm being cut away or recessed as indicated at 33 and 38 to receive the shank of these fastening screws. In a similar manner an intermediate screw 34 is provided which is also adapted to act as an additional abutment for the signal arm, as shown in Fig. 1.

This signal is very simple and compact in construction, and by arranging the parts as described, a very thin casing may be used which renders the same inconspicuous when not in use. The signal, moreover, is not liable to get out of order or rattle under the constant vibration of the car.

I claim as my invention:—

1. In a left turn signal of the character described, a casing having an opening, a signal arm arranged in said casing, said signal arm being in the form of an upwardly pointing arrow having a pointed head, means arranged at the lower end of said signal arm for swinging said signal arm in and out of said casing through said opening, a cam-shaped detent finger pivotally mounted in said casing above the pointed head of said signal arm, and spring means adapted to force said cam-shaped detent finger against the point and converging faces of said signal arm and thereby force said signal arm in the corresponding direction, whereby said signal arm is held in said casing by the engagement of said detent finger with the outer converging face of said head, and upon moving said signal arm outwardly past the point thereof the detent finger engages the inner converging face and forces said signal arm out of said casing.

2. In a left turn signal of the character described, a casing having an opening, a signal arm arranged in said casing, said signal arm being in the form of an upwardly pointing arrow having a pointed head, means arranged at the lower end of said signal arm for swinging said signal arm in and out of said casing through said opening, a cam-shaped detent finger pivotally mounted in said casing above the pointed head of said signal arm, and spring means adapted to force said cam-shaped detent finger against the point and converging faces of said signal arm and thereby force said signal arm in the corresponding direction, said spring means comprising a coil spring arranged below said detent finger and secured at its opposite ends to said detent finger and the wall of said casing opposite said opening, and said spring being arranged adjacent to and substantially parallel with the inner converging face of said head.

3. In a signal of a character described, a vertically disposed casing having a longitudinal opening, a signal arm arranged longitudinally in said casing, the lower end of said signal arm being offset away from the open side of the casing relatively to the body of the signal arm, a horizontal rotatable operating shaft extending through and journaled in said casing adjacent the wall of said casing opposite said opening, said operating shaft extending rearwardly from said casing and said shaft engaging the lower end of the offset portion of said signal arm whereby upon turning said shaft, the signal arm is swung in or out of said casing.

4. In a signal of the character described, a vertical casing having a longitudinal opening, a signal arm arranged longitudinally in said casing, the lower end of said signal arm being offset away from the open side of the casing relatively to the body of the signal arm, a block secured to the offset portion of said signal arm and extending into the body portion of said signal arm, and an operating rod extending through said casing and engaging the lower end of said block adjacent the side of the casing opposite said opening, said rod being adapted to swing said signal arm in and out of said casing through said opening.

5. In a signal of the character described, a casing, a signal arm arranged in said casing, means for moving said signal arm in and out of said casing, said signal arm comprising a flat sheet of metal having a reversely bent transverse marginal flange projecting from one face thereof, the reversely bent portion of said flange being continued beyond the edge of the signal arm and forming a transverse marginal flange extending from the other face of said signal arm.

WILLIAM J. SCHIRMANN.